US012603064B2

(12) United States Patent
Bi et al.

(10) Patent No.: US 12,603,064 B2
(45) Date of Patent: Apr. 14, 2026

(54) CIRCUIT AND METHOD FOR VIDEO DATA CONVERSION AND DISPLAY DEVICE

(71) Applicants: HAINING ESWIN COMPUTING TECHNOLOGY CO., LTD., Haining (CN); BEIJING ESWIN COMPUTING TECHNOLOGY CO., LTD., Beijing (CN)

(72) Inventors: Chao Bi, Beijing (CN); Wenyi Mao, Beijing (CN); Pengfei Cui, Beijing (CN); Zhe Chen, Beijing (CN)

(73) Assignees: HAINING ESWIN COMPUTING TECHNOLOGY CO., LTD., Haining (CN); BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 270 days.

(21) Appl. No.: 18/157,183

(22) Filed: Jan. 20, 2023

(65) Prior Publication Data

US 2023/0237971 A1 Jul. 27, 2023

(30) Foreign Application Priority Data

Jan. 24, 2022 (CN) ........................ 202210081204.7

(51) Int. Cl.
*G09G 3/36* (2006.01)

(52) U.S. Cl.
CPC ....... *G09G 3/36* (2013.01); *G09G 2320/0233* (2013.01); *G09G 2320/066* (2013.01); (Continued)

(58) Field of Classification Search
CPC ............. G09G 3/36; G09G 2320/0233; G09G 2320/066; G09G 2340/10; G09G 2350/00; G09G 2360/12; G09G 2370/12
See application file for complete search history.

(56) References Cited

U.S. PATENT DOCUMENTS 11,393,064 B2 7/2022 Liu et al.
2012/0140118 A1* 6/2012 Tanaka .................. H04N 5/262 348/E9.057
(Continued)

FOREIGN PATENT DOCUMENTS

CN 101521004 A * 9/2009 .......... G06T 3/4092
CN 106791437 A 5/2017
(Continued)

OTHER PUBLICATIONS

Machine translation of CN-108062759-A (Year: 2018).*
(Continued)

*Primary Examiner* — Kee M Tung
*Assistant Examiner* — Xiaoming Wei
(74) *Attorney, Agent, or Firm* — Westman, Champlin & Koehler, P.A.

(57) ABSTRACT

Disclosed is a circuit and a method for video data conversion and a display device. The circuit comprises: a pixel splicing module, to sequentially receive each group of pixel data in each frame of image data in input video data, to perform pixel splicing on the received pixel data, and to output spliced pixel data; a data conversion module, to perform data processing on the spliced pixel data to convert each frame of image data into first image data representing a first part of the corresponding frame of image and second image data representing a second part of the corresponding frame of image. The first part at least comprises a left half part of the frame of image, the second part at least comprises a right half part of the frame of image. Data throughput requirements can be met while dynamic contrast and sharpening processing is performed.

10 Claims, 6 Drawing Sheets

(52) U.S. Cl.
CPC ..... *G09G 2340/10* (2013.01); *G09G 2350/00* (2013.01); *G09G 2360/12* (2013.01); *G09G 2370/12* (2013.01)

(56) References Cited

U.S. PATENT DOCUMENTS

| | | | | |
|---|---|---|---|---|
| 2016/0323537 | A1 * | 11/2016 | Lee | G06T 1/20 |
| 2017/0300271 | A1 * | 10/2017 | Ohwa | G06F 3/0659 |
| 2020/0112708 | A1 * | 4/2020 | Morgan | G09G 5/397 |
| 2021/0183013 | A1 | 6/2021 | Deng | |
| 2021/0358073 | A1 | 11/2021 | Liu et al. | |
| 2022/0138960 | A1 * | 5/2022 | Takeda | G06T 7/254<br>382/107 |
| 2022/0301606 | A1 * | 9/2022 | Huang | G11C 7/222 |

FOREIGN PATENT DOCUMENTS

| | | | | | |
|---|---|---|---|---|---|
| CN | 108062759 | A | * | 5/2018 | G06T 7/187 |
| CN | 109325901 | A | * | 2/2019 | G06T 1/60 |
| CN | 111294644 | A | | 6/2020 | |
| CN | 112055159 | A | | 12/2020 | |
| CN | 113672183 | A | | 11/2021 | |
| CN | 114495855 | A | | 5/2022 | |
| CN | 115065793 | A | | 9/2022 | |

OTHER PUBLICATIONS

Machine translation of CN-101521004-A (Year: 2009).*
Li, machine translation of CN-101521004-A (Year: 2009).*
Jin, machine translation of CN-109325901-A (Year: 2019).*
First Office Action, including Search Report, for Chinese Patent Application No. 202210081204.7, dated Oct. 31, 2022, 17 pages.

* cited by examiner

CIRCUIT AND METHOD FOR VIDEO DATA CONVERSION AND DISPLAY DEVICE

CROSS-REFERENCE TO RELATED APPLICATIONS

The present application claims priority to Chinese Patent Application No. 202210081204.7, filed on Jan. 24, 2022, entitled by "CIRCUIT AND METHOD FOR VIDEO DATA CONVERSION AND DISPLAY DEVICE", and published as CN114495855A on May 13, 2022, the contents of which are incorporated herein by reference in their entireties.

TECHNICAL FIELD

The present disclosure relates to a field of video image processing technology, in particular to a circuit and a method for video data conversion and a display device.

BACKGROUND

With the increasing demand for display quality of images, the physical resolution of a display device has been upgraded from standard definition, high definition to full high definition, ultra-high definition, and 8K. Therefore, the bandwidth of a high-definition multimedia interface (HDMI) or display port (DP) interface between a display card and a display chip is also increasing to meet the above demand.

In general, an input interface of a liquid crystal display (LCD) video controller is a HDMI (High Definition Multimedia Interface) or DP (DisplayPort) interface. After an input video is captured and processed, it is finally output to an LCD screen via the HDMI or DP interface between the LCD video controller and the LCD screen. Usually, if a video with a resolution of 4K*2K is output via a gigabit network interface, nearly 20 gigabit network cables are required to fully output the video to the LCD screen. The controller has many interfaces, and if a single video controller may have a load capacity with a larger resolution, more gigabit network interfaces are required, which makes the video controller having a larger size, so the load capacity of the single LCD video controller is commonly within a resolution of 4K*2K. Meanwhile, because a system clock is limited by technology, the data throughput cannot be increased by increasing the frequency.

Therefore, in the era of 4K and 8K, HDMI/DP meets the requirement of rapidly increasing data volume by converting single-pixel video data into dual-pixel video data (that is, simultaneously transmitting pixel data by using two transmission channels) and reducing frequency. However, when the dual-pixel video data is subjected to dynamic contrast and sharpening processing, the data throughput of a corresponding processing apparatus is often less than the volume of the input dual-pixel video data, such that the dynamic contrast and sharpening processing of the input dual-pixel video data cannot be implemented.

Therefore, it is necessary to provide an improved technical solution to solve the above technical problems existing in the prior art.

SUMMARY

To solve the above technical problems, the present disclosure provides a circuit and a method for video data conversion and a display device, which can meet data throughput requirements while performing dynamic contrast and sharpening processing on multi-pixel video data, may be applicable to filters with different numbers of stages, and can eliminate middle bright lines on a re-synthesized video image.

According to a first aspect of the present disclosure, a video data conversion circuit is provided and comprises: a pixel splicing module, configured to sequentially receive each group of pixel data in each frame of image data in input video data, to perform pixel splicing on the received pixel data, and to output spliced pixel data; and

- a data conversion module, configured to perform data processing on the spliced pixel data to convert each frame of image data into first image data representing a first part of a corresponding frame of image and second image data representing a second part of the corresponding frame of image, the first image data and the second image data being configured for driving a display panel to complete display of the corresponding frame of image,
- wherein the first part at least comprises a left half part of the corresponding frame of image, and the second part at least comprises a right half part of the corresponding frame of image.

Optionally, the first part and the second part have an overlap region.

Optionally, the data conversion module further comprises:

- a first static memory, configured to write the received spliced pixel data according to a first write address sequence when receiving a first write enable signal being valid, so as to store the first image data corresponding to each frame of image data, and to output the stored first image data according to a first read address sequence when receiving a first read enable signal being valid;
- a second static memory, configured to write the received spliced pixel data according to a second write address sequence when receiving a second write enable signal being valid, so as to store the second image data corresponding to each frame of image data, and to output the stored second image data according to a second read address sequence when receiving a second read enable signal being valid;
- a first write controller, configured to output the first write enable signal being valid when receiving a row enable signal, and to output the first write enable signal being invalid when receiving a second flag signal;
- a first read controller, configured to output the first read enable signal being valid when receiving a first flag signal;
- a second write controller, configured to output the second write enable signal being valid when receiving the first flag signal, and to output the second write enable signal being invalid when receiving a third flag signal;
- a second read controller, configured to output the second read enable signal being valid when receiving the first flag signal; and
- a flag signal generating unit, configured to generate the first flag signal, the second flag signal, and the third flag signal according to a row resolution of the display panel, the row enable signal, and a size of an image overlap region, wherein the image overlap region is the overlap region of the first part and the second part.

Optionally, each of the first static memory and the second static memory comprises a first enable terminal and a second enable terminal;

- the first enable terminal of the first static memory is configured to receive the first write enable signal, and the second enable terminal of the first static memory is configured to receive the first read enable signal; and the first enable terminal of the second static memory is configured to receive the second write enable signal, and the second enable terminal of the second static memory is configured to receive the second read enable signal.

Optionally, each of the first static memory and the second static memory comprises a third enable terminal; and the data conversion module further comprises:

a first selector, wherein a first input terminal of the first selector is configured to receive the first write enable signal, a second input terminal of the first selector is configured to receive the first read enable signal, an output terminal of the first selector is connected to the third enable terminal of the first static memory, and the first selector is configured to selectively transmit the first write enable signal and the first read enable signal to the third enable terminal of the first static memory according to a first gating signal, so as to control the first static memory to perform data read/write operation in a time-sharing manner; and a second selector, wherein a first input terminal of the second selector is configured to receive the second write enable signal, a second input terminal of the second selector is configured to receive the second read enable signal, an output terminal of the second selector is connected to the third enable terminal of the second static memory, and the second selector is configured to selectively transmit the second write enable signal and the second read enable signal to the third enable terminal of the second static memory according to a second gating signal, so as to control the second static memory to perform data read/write operation in a time-sharing manner, wherein each group of pixel data comprises N pieces of adjacent pixel data, and the pixel splicing module is configured to complete pixel splicing once within every N clock cycles. N being greater than or equal to 2.

Optionally, the flag signal generating unit is configured to generate the first flag signal when a start position of the image overlap region corresponding to each row of pixel data in each frame of image data is detected, to generate the second flag signal when an end position of the image overlap region corresponding to each row of pixel data in each frame of image data is detected, and to generate the third flag signal when an end position of each row of pixel data in each frame of image data is detected.

Optionally, the flag signal generating unit is implemented by a comparator, and the comparator is configured to, by at least one of an operation for comparing a read/write address of each frame of image data to a preset reference address, and an operation for comparing a read/write time of each frame of image data to a preset time threshold, determine whether the start position and end position of the image overlap region corresponding to each row of pixel data in each frame of image data are detected, and to determine whether the end position of each row of pixel data in each frame of image data is detected.

Optionally, the video data conversion circuit further comprises:

a data alignment module, configured to determine storage positions of pixel data, corresponding to the start position of the image overlap region, in the first static memory and the second static memory, respectively, according to a width of a target image and the size of the image overlap region, and to perform alignment processing on the first image data and the second image data according to the determined storage positions.

According to a second aspect of the present disclosure, a display device is provided and comprises: an interface circuit configured to output a plurality of pieces of pixel data in each frame of image data in input video data in groups:

the video data conversion circuit, described as above, configured to process each group of pixel data to convert each frame of image data into first image data representing a first part of a corresponding frame of image and second image data representing a second part of the corresponding frame of image;

a synthesis circuit, configured to perform data synthesis processing on the first image data and the second image data to obtain target image data; and a display panel, configured to complete display of the corresponding frame of image on the basis of the target image data, wherein the first part at least comprises a left half part of the corresponding frame of image, and the second part at least comprises a right half part of the corresponding frame of image.

According to a third aspect of the present disclosure, a method for video data conversion is provided, and comprises: sequentially receiving each group of pixel data in each frame of image data in input video data, and performing pixel splicing on the received pixel data to obtain spliced pixel data; and performing data processing on the spliced pixel data to convert each frame of image data into first image data representing a first part of a corresponding frame of image and second image data representing a second part of the corresponding frame of image.

wherein the first part at least comprises a left half part of the corresponding frame of image, and the second part at least comprises a right half part of the corresponding frame of image.

Optionally, the first part and the second part have an overlap region.

Optionally, the method for video data conversion further comprises:

performing alignment processing on the first image data and the second image data, and outputting data obtained after performing the alignment processing.

By adopting the technical solution according to embodiments of the present disclosure, the data throughput requirements can be met while the dynamic contrast and sharpening processing is performed on the multi-pixel video data (that is, the plurality of pieces of pixel data are transmitted every time).

It should be noted that the general description above and the detailed description below are only exemplary and explanatory, and cannot limit the present disclosure.

DETAILED DESCRIPTION OF THE EMBODIMENTS

For the convenience of understanding the present disclosure, the present disclosure will be more comprehensively described below with reference to the relevant accompanying drawings. The preferred embodiments of the present disclosure are shown in the accompanying drawings. However, the present disclosure may be implemented in different forms, and is not limited to the embodiments described herein. On the contrary, the objective of providing these embodiments is to make a more thorough and comprehensive understanding of the content provided by the present disclosure.

Figure 1:
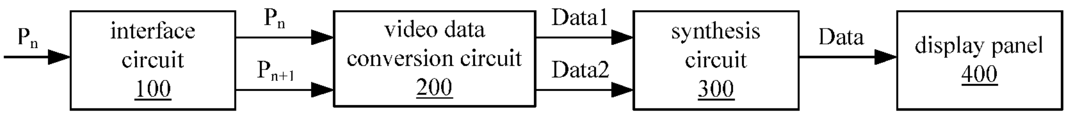
FIG. 1 shows a schematic structural diagram of a display device provided according to an embodiment of the present disclosure.

Referring to FIG. 1, the present disclosure provides a display device, comprising an interface circuit 100, a video data conversion circuit 200, a synthesis circuit 300, and a display panel 400.

Herein, the interface circuit 100 is configured to output a plurality of pieces of pixel data in each frame of image data in input video data in groups. The interface circuit 100 connects a display card and a display chip in the display device, is, for example, any one of a high-definition multimedia interface (HDMI) and a display port (DP) interface, and is configured to implement transmission of the input video data between the display card and the display chip. In this embodiment, the interface circuit 100 receives single-pixel video data and outputs multi-pixel video data, that is to say, an input terminal of the interface circuit 100 comprises a single data transmission path on the basis of which one piece of pixel data $P_n$ is transmitted each time, while an output terminal of the interface circuit 100 comprises a plurality of data transmission paths on the basis of which a plurality of pieces of adjacent pixel data (comprising $P_n$, $P_{n+1}$) may be transmitted simultaneously each time. In this way, the interface circuit 100 can implement conversion of the single-pixel video data to the multi-pixel video data, and thus can meet the demand for dramatic increase in the volume of data to be transmitted by even reducing the frequency when the resolution of the display panel 400 is increased, n being a natural number.

The video data conversion circuit 200 is configured to process each group of pixel data output by the interface circuit 100 to convert each frame of image data in the input video data into first image data Data1 representing a first part of a corresponding frame of image and second image data Data2 representing a second part of the corresponding frame of image. Herein, the first part at least comprises a left half part of the corresponding frame of image, and the second part at least comprises a right half part of the corresponding frame of image.

The synthesis circuit 300 is configured to perform data synthesis processing on the first image data Data1 and the second image data Data2 to obtain target image data (Data). In this embodiment, the synthesis circuit 300 may merge the first image data Data1 and the second image data Data2 into the target image data (Data) with a target size after performing processing, comprising dynamic contrast, image sharpening, filtering, etc., on the first image data Data1 and the second image data Data2 in a time-sharing manner.

The display panel 400 completes display of the corresponding frame of image on the basis of the target image Data, and thus completes display of an input video on the basis of the display of each frame of image.

Figure 2:
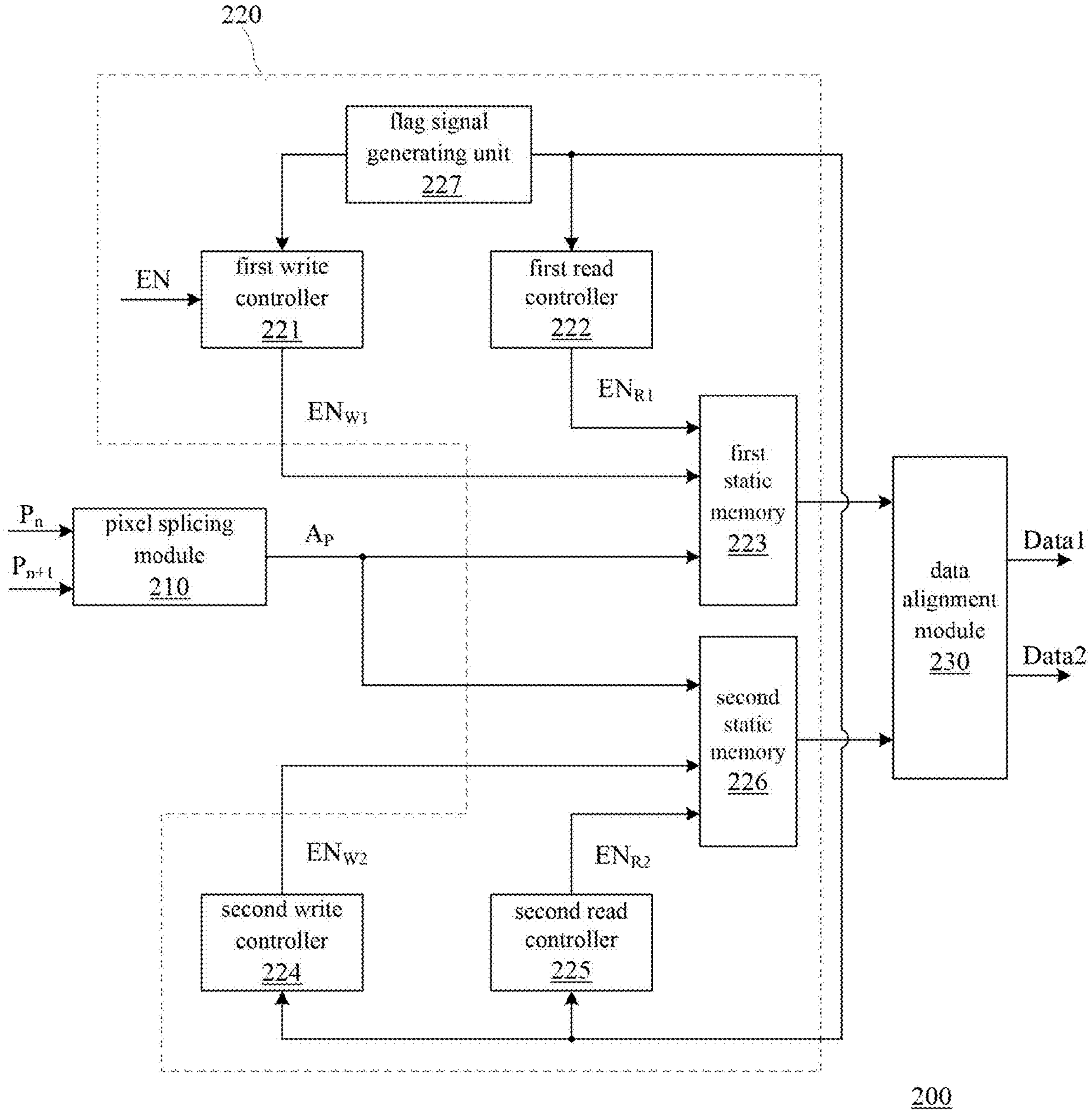
FIG. 2 shows a schematic structural diagram of a video data conversion circuit provided according to a first embodiment of the present disclosure.
Figure 3:
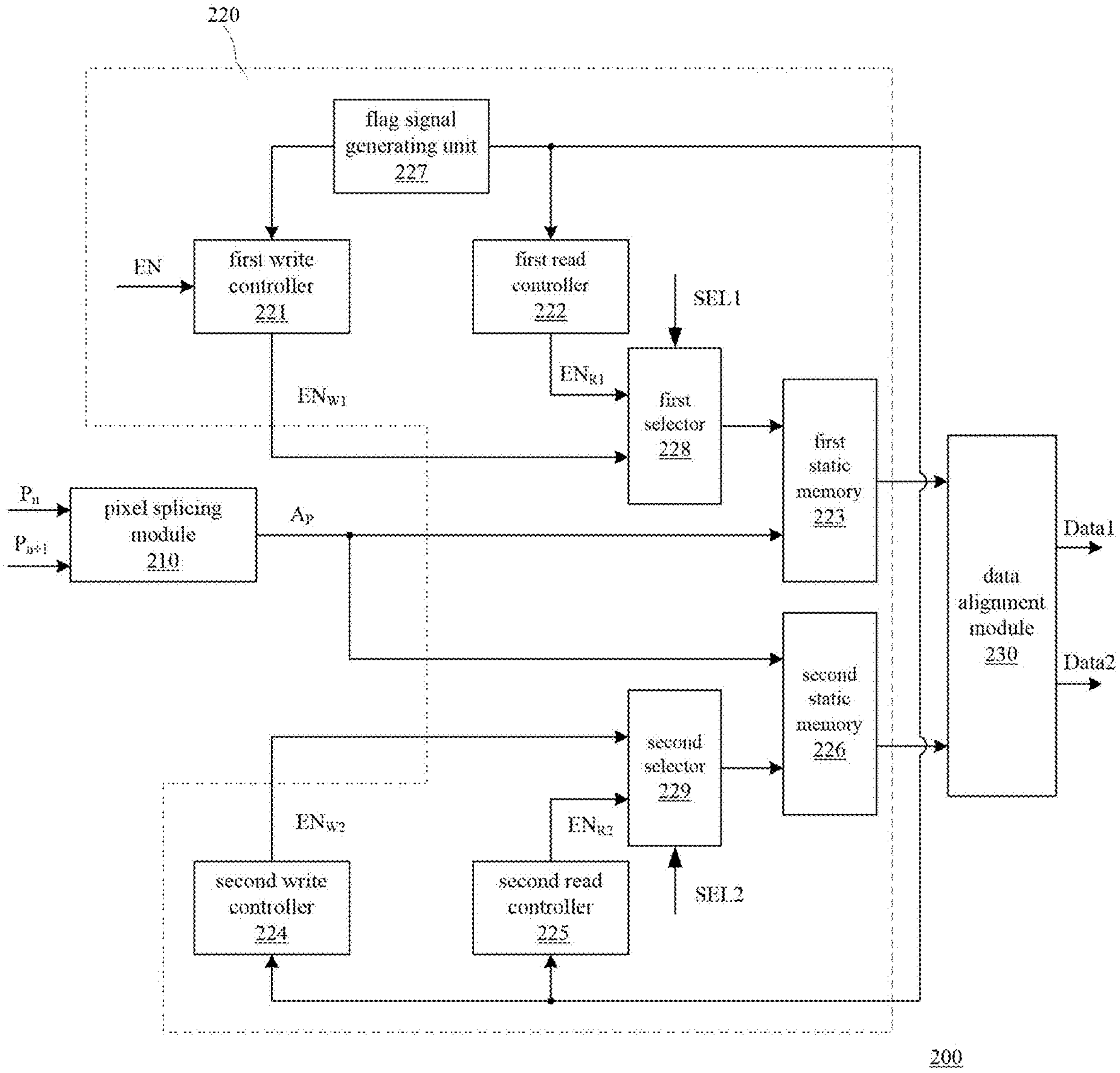
FIG. 3 shows a schematic structural diagram of a video data conversion circuit provided according to a second embodiment of the present disclosure.

Referring to FIG. 2 and FIG. 3, the video data conversion circuit 200 provided by the present disclosure further comprises a pixel splicing module 210, a data conversion module 220, and a data alignment module 230.

Herein, the pixel splicing module 210 is configured to sequentially receive each group of pixel data in each frame of image data in input video data, to perform pixel splicing on the received pixel data, and to output spliced pixel data $A_P$. Herein, the pixel splicing module 210 completes pixel splicing once within every N clock cycles, each group of pixel data comprises N adjacent pixel data ($P_n$, $P_{n+1}$) in the data of the corresponding frame of image, and each piece of pixel data is only subjected to pixel splicing once. N being greater than or equal to 2.

For example where each group of pixel data comprises two adjacent pixels, the pixel splicing module 210 receives a first group of pixel data (such as comprising first pixel data P0 and second pixel data P1 adjacent to each other) in a first clock cycle, and receives a second group of pixel data (such as comprising third pixel data P2 and fourth pixel data P3 adjacent to each other) in a second clock cycle; and by parity of reasoning, it receives an $n^{th}$ group of pixel data in an $n^{th}$ clock cycle. Moreover, the pixel splicing module 210 performs pixel splicing on the received pixel data, comprising splicing and combining m groups of pixel data received within every m clock cycles and then outputs the obtained data, m being greater than or equal to 2.

The data conversion module 220 is configured to perform data processing on the spliced pixel data $A_p$ to convert each frame of image data into the first image data Data1 representing the first part of the corresponding frame of image and the second image data Data2 representing the second part of the corresponding frame of image. It may be understood that the first image data Data1 and the second image data Data2 are configured for driving the display panel 400 to complete the display of the corresponding frame of image. In this embodiment, each frame of image data in the input multi-pixel video data is converted into the first image data Data1 containing at least the left half part of the corresponding frame of image and the second image data Data2 containing at least the right half part of the corresponding frame of image, such that when the data corresponding to each frame of image is subjected to the dynamic contrast and sharpening processing subsequently, the data throughput requirements of the corresponding processing apparatus may be met by processing the first image data Data1 and the second image data Data2 at times in a time-sharing manner.

Figure 4:
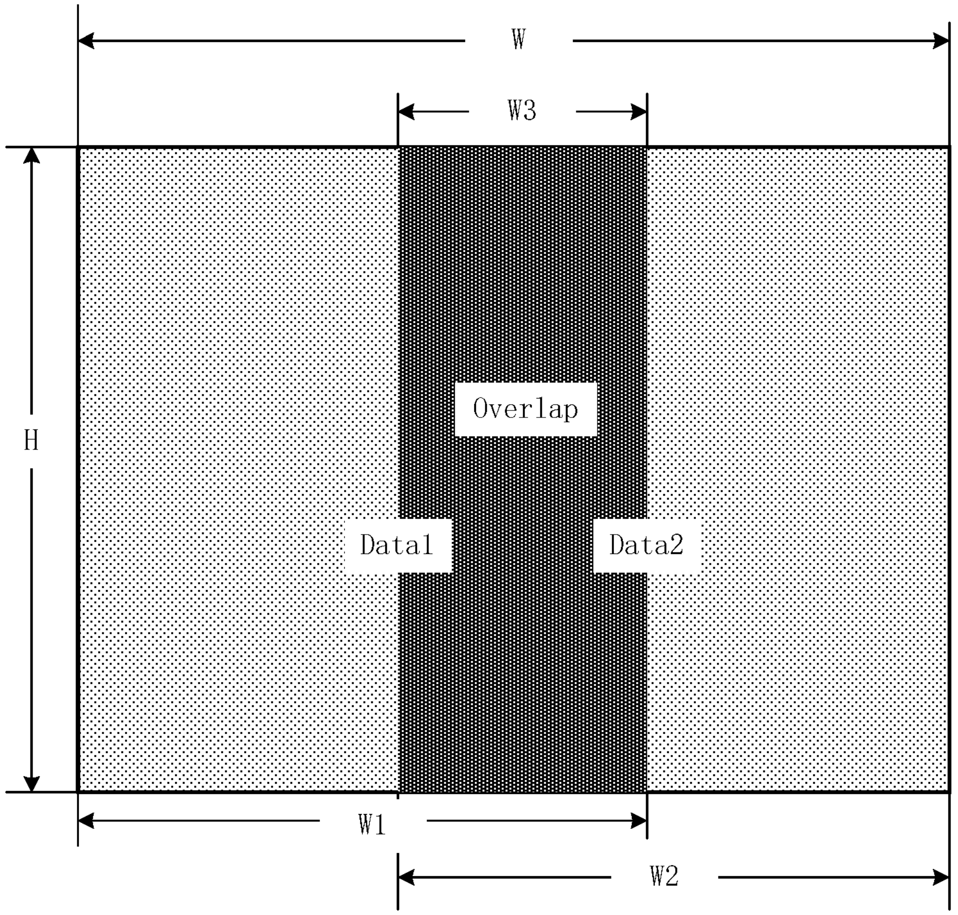
FIG. 4 shows a schematic diagram of first image data and second image data corresponding to a frame of image provided according to an embodiment of the present disclosure.

Further, the first part and the second part of the above each frame of image have an overlap region, that is to say, the first image data Data1 representing the first part of the corresponding frame of image and the second image data Data2 representing the second part of the corresponding frame of image, generated after conversion, have an image overlap region, which is marked as Overlap, as shown in FIG. 4. In this embodiment, by arranging the overlap region, i.e., the image overlap region Overlap, the subsequent synthesis circuit 300 can enhance the consistency of the brightness at corresponding synthesis positions of the first image data Data1 and the second image data Data2 when performing filtering and image synthesis processing on the first image data Data1 and the second image data Data2, thereby eliminating middle bright lines of a synthesized image and enhancing a display effect.

In the present disclosure, to implement the conversion of each frame of image data to the first image data Data1 and the second image data Data2 by controlling a static random access memory (SRAM) to store the spliced pixel data $A_p$ in a specific format according to a specific read/write sequence, a conversion method and a required circuit structure are simple, and the corresponding data conversion process can be completed quickly and accurately. As shown in FIG. 2 and FIG. 3, the data conversion module 220 further comprises a first write controller 221, a first read controller 222, a first static memory 223, a second write controller 224, a second read controller 225, a second static memory 226, and a flag signal generating unit 227.

Herein, the first static memory 223 is configured to write the received spliced pixel data $A_p$ according to a first write address sequence when receiving a first write enable signal $EN_{W1}$ being valid, so as to store the first image data Data1 corresponding to each frame of image data, and to output the stored first image data Data1 according to a first read address sequence when receiving a first read enable signal $EN_{R1}$ being valid. Similarly, the second static memory 226 is configured to write the received spliced pixel data $A_p$ according to a second write address sequence when receiving a second write enable signal $EN_{W2}$ being valid, so as to store the second image data Data2 corresponding to each frame of image data, and to output the stored second image data Data2 according to a second read address sequence when receiving a second read enable signal $EN_{R2}$ being valid.

In the present disclosure, the pixel splicing module 210 performs pixel splicing on the received pixel data, comprising splicing and combining m groups of pixel data received within every m clock cycles and then outputting the obtained data, where m is greater than or equal to 2, and a specific value of m may be determined according to a data bit width of the selected static memory and the number of pixel data contained in each group of pixel data received by the pixel splicing module 210. For example, if it is assumed that the data bit width of the selected static memory is 4, and the number of pixel data contained in each group of pixel data received by the pixel splicing module 210 is 2, then m is equal to 2. In this way, the pixel splicing module 210 can output the spliced pixel data $A_p$ containing four pieces of pixel data within every m clock cycles to adapt to the data bit width of the static memory, such that one address of the static memory can correspond to four pieces of pixel data, thereby determining a read/write time sequence for subsequent read/write control.

The first write controller 221 is configured to output the first write enable signal $EN_{W1}$ being valid when receiving a row enable signal EN, and to output the first write enable signal $EN_{W1}$ being invalid when receiving a second flag signal. The first read controller 222 is configured to output the first read enable signal $EN_{R1}$ being valid when receiving a first flag signal. The second write controller 224 is configured to output the second write enable signal $EN_{W2}$ being valid when receiving the first flag signal, and to output the second write enable signal $EN_{W2}$ being invalid when receiving a third flag signal. The second read controller 225 is configured to output the second read enable signal $EN_{R2}$ being valid when receiving the first flag signal.

In a first embodiment of the present disclosure, referring to FIG. 2, each of the first static memory 223 and the second static memory 226 comprises a first enable terminal and a second enable terminal, that is to say, the first static memory 223 and the second static memory 226 in this embodiment are dual-port memories. Herein, the first enable terminal of the first static memory 223 is configured to receive the first write enable signal $EN_{W1}$, and the second enable terminal of the first static memory 223 is configured to receive the first read enable signal $EN_{R1}$. The first enable terminal of the second static memory 226 is configured to receive the second write enable signal $EN_{W2}$, and the second enable terminal of the second static memory 226 is configured to receive the second read enable signal $EN_{R2}$. In this embodiment, the first static memory 223 and the second static memory 226 each having double enable terminals may receive the read enable signal and the write enable signal at the same time to simultaneously read and write the spliced pixel data $A_P$, such that the read and write are fast; and additional gating signals are not required to perform gating control on read enable and write enable, such that the number of control signals required is smaller.

In a second embodiment of the present disclosure, referring to FIG. 3, each of the first static memory 223 and the second static memory 226 comprises a third enable terminal, that is to say, the first static memory 223 and the second static memory 226 in this embodiment are single-port static random access memories (SPSRAMs). Herein, the data conversion module 220 further comprises a first selector 228 and a second selector 229. A first input terminal of the first selector 228 receives the first write enable signal $EN_{W1}$, a second input terminal of the first selector 228 receives the first read enable signal $EN_{R1}$, an output terminal of the first selector 228 is connected to the third enable terminal of the first static memory 223, and the first selector 228 selectively transmits the first write enable signal $EN_{W1}$ and the first read enable signal $EN_{R1}$ to the third enable terminal of the first static memory 223 according to a first gating signal SEL1, so as to control the first static memory 223 to perform data read and write operation in a time-sharing manner. A first input terminal of the second selector 229 receives the second write enable signal $EN_{W2}$, a second input terminal of the second selector 229 receives the second read enable signal $EN_{R2}$, an output terminal of the second selector 229 is connected to the third enable terminal of the second static memory 226, and the second selector 229 selectively transmits the second write enable signal $EN_{W2}$ and the second read enable signal $EN_{R2}$ to the third enable terminal of the second static memory 226 according to a second gating signal SEL2, so as to control the second static memory 226 to perform data read/write operation in a time-sharing manner. In this embodiment, since the pixel splicing module 210 completes pixel splicing once within every N clock cycles, it may perform read enable and write enable on the first static memory 223 and the second static memory 226 respectively in every N clock cycles for at least one time, and then by setting a reasonable control time sequence of the first gating signal SEL1 and the second gating signal SEL2, the first static memory 223 and the second static memory 226 may be controlled to respectively perform read/write operation on the spliced pixel data $A_P$ within every N clock cycles for one time, which may be equivalent to simultaneously reading and writing the spliced pixel data $A_P$ with N clock cycles as a cycle. Moreover, the first static memory 223 and the second static memory 226 each having the single enable terminal may save the circuit area.

The flag signal generating unit is configured to generate the first flag signal, the second flag signal, and the third flag signal according to a row resolution of the display panel, the row enable signal EN, and a size of the image overlap region Overlap. The flag signal generating unit 227 is configured to generate the first flag signal when a start position (an edge position of a leftmost side of the region Overlap in FIG. 4) of the image overlap region Overlap corresponding to each row of pixel data in each frame of image data is detected, to generate the second flag signal when an end position (an edge position of a rightmost side of the region Overlap in FIG. 4) of the image overlap region Overlap corresponding to each row of pixel data in each frame of image data is detected, and to generate the third flag signal when an end position of each row of pixel data in each frame of image data is detected.

For example, the flag signal generating unit 227 is implemented by a comparator. For example, the comparator is configured to, by at least one of an operation for comparing a read/write address of each frame of image data to a preset reference address, and an operation for comparing a read/write time of each frame of image data to a preset time threshold, determine whether the start position and end position of the image overlap region Overlap corresponding to each row of pixel data in each frame of image data are detected, and to determine whether the end position of each row of pixel data in each frame of image data is detected.

Referring to FIG. 4, it is assumed that a width and a height of a multi-half-frame image corresponding to the first image data Data1 are W1 and H, a width and a height of a multi-half-frame image corresponding to the second image data Data2 are W2 and H, and a width and a height of the image overlap region Overlap are W3 and H. It may be understood that the number of pixel data rows and the number of pixel data contained in each row correspondingly contained in the first image data Data1, the second image data Data2, and the image overlap region Overlap may be obtained on the basis of their respective corresponding image sizes (in direct proportion). Meanwhile, since the number of pixel data corresponding to each storage address in the first static memory 223 and the second static memory 226 is constant, and the time required to write or read the corresponding pixel data according to one storage address is constant, the preset reference address and the preset time threshold may be determined on the basis of preset sizes of the first image data Data1, the second image data Data2, and the image overlap region Overlap. Therefore, by comparison, it may be determined whether the start position and end position of the image overlap region Overlap corresponding to each row of pixel data in each frame of image data are detected, it may be determined whether the end position of each row of pixel data in each frame of image data is detected, and the corresponding flag signal is output.

In the embodiment of the present disclosure, the width W3 of the image overlap region Overlap may be adjusted according to the number of stages of a filter applied in subsequent filtering, so as to adapt to processing of filters with different numbers of stages. For example, the width W3 of the image overlap region Overlap is in direct proportion to the number of stages of the filter, and the width W3 of the image overlap region Overlap is greater than at least half of the number of stages of the filter. It may be understood that the greater the width W3 of the image overlap region Overlap is, the more the pixel data, relative to the middle part of the whole image, contained in the first image data Data1 and the second image data Data2 is, the higher the consistency of the brightness at the corresponding synthesis positions of the first image data Data1 and the second image data Data2 processed by the filter is during subsequent synthesis and filtration of the image, the darker the middle bright lines generated in the final synthesized image are, and the better the display effect is.

Figure 5A:
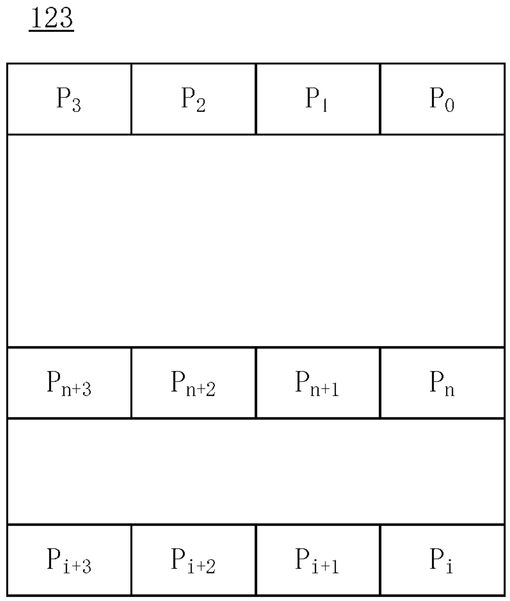
FIG. 5*a* shows a schematic diagram of first image data of a memory in the first static memory provided according to an embodiment of the present disclosure.
Figure 5B:
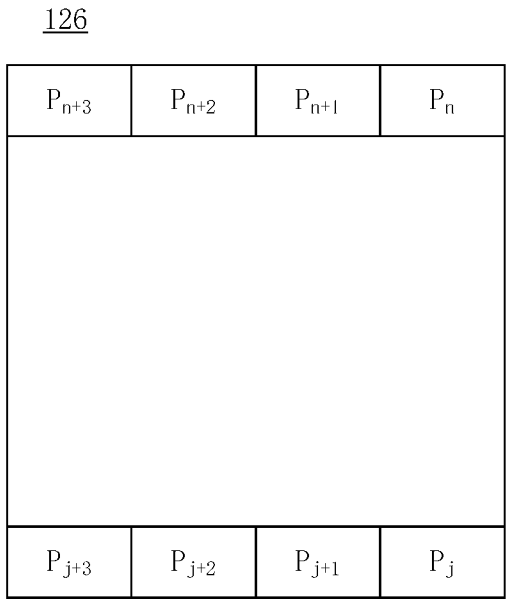
FIG. 5*b* shows a schematic diagram of second image data of a memory in the second static memory provided according to an embodiment of the present disclosure.

Referring to FIG. 5*a* and FIG. 5*b*, an example of the process that the data conversion module 220 performs the read/write operation on the spliced pixel data $A_P$ output by the pixel splicing module 210 to convert the data of a certain frame of image to obtain the first image data Data1 and the second image data Data2 is as follows:

When the first write controller 221 receives the row enable signal EN being valid corresponding to a certain row, it outputs the first write enable signal $EN_{W1}$ being valid to control the first static memory 223 to start writing the spliced pixel data $A_P$ from the first group of pixel data ($P_0$, $P_1$, $P_2$, $P_3$) by the first write address sequence according to vesa standards, where four pieces of pixel data are written each time according to one write address. Meanwhile, the flag signal generating unit 227 starts comparing the write address or data write time to the corresponding threshold.

It is assumed that when the first static memory 223 writes a group of pixel data ($P_n$, $P_{n+1}$, $P_{n+2}$, $P_{n+3}$) according to a certain write address, the flag signal generating unit 227 detects the start position of the image overlap region Overlap, and then outputs the first flag signal to trigger the second write controller 224 to output the second write enable signal $EN_{W2}$ being valid to control the second static memory 226 to start writing the spliced pixel data $A_P$ from the current group of pixel data ($P_n$, $P_{n+1}$, $P_{n+2}$, $P_{n+3}$) by the second write address sequence according to the vesa standards. Meanwhile, the first read controller 222 is also triggered to output the first read enable signal $EN_{R1}$ being valid to control the first static memory 223 to start outputting the corresponding pixel data from the first group of pixel data ($P_0$, $P_1$, $P_2$, $P_3$) according to the first read address until the corresponding group of pixel data ($P_n$, $P_{n+1}$, $P_{n+2}$, $P_{n+3}$) or k groups of pixel data after the corresponding group of pixel data ($P_n$, $P_{n+1}$, $P_{n+2}$, $P_{n+3}$) is or are output, the first static memory 223 is controlled to stop outputting, the second read controller 225 is triggered to output the second read enable signal $EN_{R2}$ being valid to control the second static memory 226 to start outputting the corresponding pixel data from the corresponding group of pixel data ($P_n$, $P_{n+1}$, $P_{n+2}$, $P_{n+3}$) according to the second read address sequence until the corresponding group of pixel data ($P_j$, $P_{j+1}$, $P_{j+2}$, $P_{j+3}$) or k groups of pixel data after the corresponding group of pixel data ($P_j$, $P_{j+1}$, $P_{j+2}$, $P_{j+3}$) is or are output, and the second static memory 226 is controlled to stop outputting, where k is any natural number from 0 to 3.

It is assumed that when the first static memory 223 writes a group of pixel data ($P_i$, $P_{i+1}$, $P_{i+2}$, $P_{i+3}$) according to a certain write address, the flag signal generating unit 227 detects the end position of the image overlap region Overlap, and then outputs the second flag signal to trigger the first write controller 221 to output the first write enable signal $EN_{W1}$ being invalid to control the first static memory 223 to stop writing the spliced pixel data $A_P$. Moreover, it is assumed that when the second static memory 226 writes a group of pixel data ($P_j$, $P_{j+1}$, $P_{j+2}$, $P_{j+3}$) according to a certain write address, the flag signal generating unit 227 detects the end position of the pixel data corresponding to a current row in the data of the frame of image, and then outputs the third flag signal to trigger the second write controller 224 to output the second write enable signal $EN_{W2}$ being invalid to control the second static memory 226 to stop writing the spliced pixel data $A_P$. Then, the first write controller 221 receives the row enable signal EN being valid corresponding to a next row and repeats the above process.

It may be understood that after the above process is performed on the data corresponding to the frame of image for row-number times, the first image data Data1 and the second image data Data2 may be obtained from the outputs of the first static memory 223 and the second static memory 226, respectively, thereby completing the conversion of the data of the frame of image. Next, the conversion of data of other frames of image in the input video data may be completed by repeating the above process.

The data alignment module 230 is configured to determine storage positions of pixel data, corresponding to the start position of the image overlap region Overlap, in the first static memory 223 and the second static memory 226 respectively according to a width W of a target image and the size (comprising the width W3 of the image overlap region Overlap) of the image overlap region Overlap, and to perform alignment processing on the first image data Data1 and the second image data Data2 according to the determined storage positions and transmit the aligned image data to a post-stage circuit.

In this embodiment, since the two static memories are used to store the pixel data and simultaneously output the plurality of pieces of pixel data ($P_n$, $P_{n+1}$, $P_{n+2}$, $P_{n+3}$) corresponding to one address each time, and the storage positions of a pixel, corresponding to the start position of the image overlap region Overlap, in corresponding addresses of the first static memory 223 and the second static memory 226 are not fixed and may be, for example, in any one of $P_n$, $P_{n+1}$, $P_{n+2}$, $P_{n+3}$. Therefore, in the embodiment of the present disclosure, the data alignment module 230 is arranged to perform alignment processing such as data rearrangement on the first image data Data1 and the second image data Data2 according to the width W of the target image and the size of the image overlap region Overlap, so as to ensure that the complete and accurate target image data (Data) can be output.

Based on the above description, the present disclosure can meet the data throughput requirements while performing the dynamic contrast and sharpening processing on the multi-pixel video data, may be applicable to the filters with different numbers of stages, and can eliminate the middle bright lines on the re-synthesized video image, which is advantageous to enhancing the display effect.

It should be noted that the modules and units described above maybe implemented by hardware. For example, the modules and units can all be implemented by hardware, for example implemented by circuit.

Figure 6:
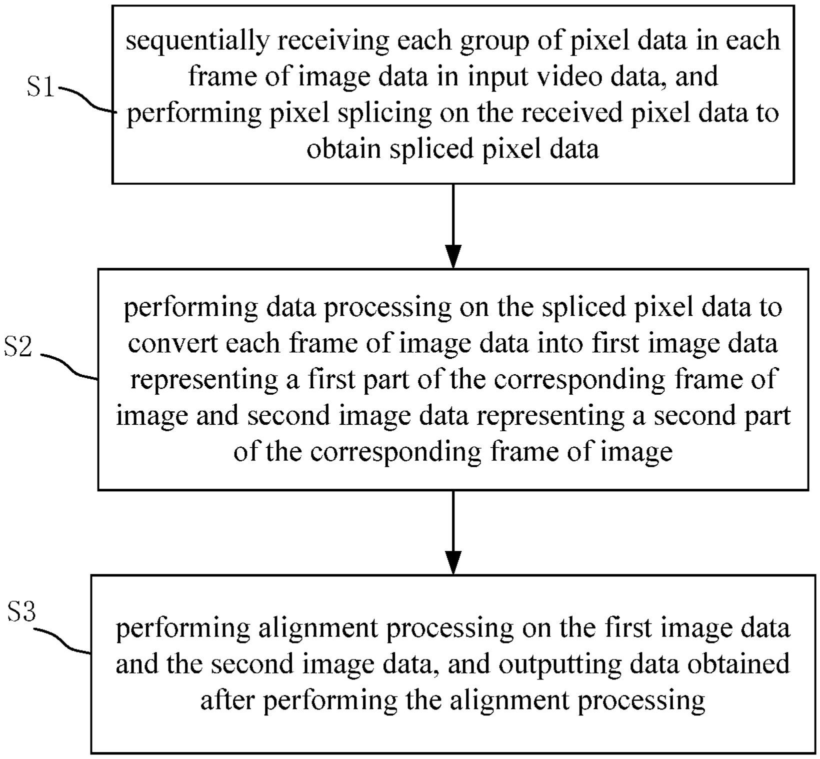
FIG. 6 shows a flowchart of a method for video data conversion provided according to an embodiment of the present disclosure.

Further, the present disclosure provides a method for video data conversion. The method may be applied to the video data conversion circuit and display device described in FIG. 1 to FIG. 4, FIG. 5*a*, and FIG. 5*b*. During specific implementation, the specific implementation of each step in the method for video data conversion may refer to the aforementioned embodiment of the video data conversion circuit. Referring to FIG. 6, the method specifically comprises the following steps:

In Step S1, each group of pixel data in each frame of image data in input video data is sequentially received, and pixel splicing is performed on the received pixel data to obtain spliced pixel data.

In this embodiment, Step S1 may be understood with reference to the foregoing description of the pixel splicing module 210, which will not be repeated here.

In Step S2, data processing is performed on the spliced pixel data to convert each frame of image data into first image data representing a first part of the corresponding frame of image and second image data representing a second part of the corresponding frame of image. Herein, the first part at least comprises a left half part of the frame of image, the second part at least comprises a right half part of the frame of image, and the first part and the second part have an overlap region.

In this embodiment, Step S2 may be understood with reference to the foregoing description of the data conversion module 220, which will not be repeated here.

In Step S3, alignment processing is performed on the first image data and the second image data, and output is performed. In this embodiment, Step S3 may be understood with reference to the foregoing description of the data alignment module 230, which will not be repeated here.

In conclusion, firstly, in the technical solution of the present disclosure, each frame of image data in the multi-pixel video data input via the interface circuit such as the HDMI or the DP interface is converted into two pieces of multi-half-frame image data (the first image data and the second image data) containing at least the left half part of the corresponding frame of image and at least the right half part of the corresponding frame of image, such that the two pieces of multi-half-frame image data may be processed at times in a time-sharing manner subsequently to meet the data throughput requirements while the dynamic contrast and sharpening processing is performed.

Secondly, in the technical solution of the present disclosure, the overlap region is arranged in the first image data and the second image data, such that the middle bright lines of the synthesized image can be eliminated in the subsequent video image synthesis, thereby enhancing the display effect.

Thirdly, in the technical solution of the present disclosure, the size of the overlap region between the first image data and the second image data is adjustable, so as to adapt to the processing of the filters with different numbers of stages.

Finally, it should be noted that the above embodiments are only examples to clearly illustrate the present disclosure, rather than defining the embodiments. Those of ordinary skill in the art may also make other changes or variations in different forms on the basis of the above description. It is unnecessary and impossible to enumerate all embodiments here. The obvious changes or variations arising therefrom are still within the scope of protection of the present disclosure.

What is claimed is:

1. A video data conversion circuit, comprising:

a pixel splicing circuit, configured to sequentially receive each group of pixel data in each frame of image data in input video data, to perform pixel splicing on the received pixel data, and to output spliced pixel data; and a data conversion circuit, configured to perform data processing on the spliced pixel data to convert each frame of image data into first image data representing a first part of a corresponding frame of image and second image data representing a second part of the corresponding frame of image, the first image data and the second image data being configured for driving a display panel to complete display of the corresponding frame of image, wherein the first part at least comprises a left half part of the corresponding frame of image, and the second part at least comprises a right half part of the corresponding frame of image, wherein a data synthesis processing is performed on the first image data and the second image data by a subsequent-stage circuit of the video data conversion circuit, and the data synthesis processing includes a filtering process achieved by a multi-stage filter, wherein the first part and the second part have an overlap region, a width of the overlap region expressed in number of pixel is at least greater than one-half of the number of stages of the multi-stage filter, wherein the data conversion circuit comprises:

a first static memory, configured to write the received spliced pixel data according to a first write address sequence when receiving a first write enable signal being valid, so as to store the first image data corresponding to each frame of image data, and to output the stored first image data according to a first read address sequence when receiving a first read enable signal being valid;

a second static memory, configured to write the received spliced pixel data according to a second write address sequence when receiving a second write enable signal being valid, so as to store the second image data corresponding to each frame of image data, and to output the stored second image data according to a second read address sequence when receiving a second read enable signal being valid;

a first write controller, configured to output the first write enable signal being valid when receiving a row enable signal, and to output the first write enable signal being invalid when receiving a second flag signal;

a first read controller, configured to output the first read enable signal being valid when receiving a first flag signal;

a second write controller, configured to output the second write enable signal being valid when receiving the first flag signal, and to output the second write enable signal being invalid when receiving a third flag signal;

a second read controller, configured to output the second read enable signal being valid when receiving the first flag signal; and a flag signal generating unit, configured to generate the first flag signal, the second flag signal, and the third flag signal according to a row resolution of the display panel, the row enable signal, and a size of an image overlap region, wherein the image overlap region is the overlap region of the first part and the second part.

2. The video data conversion circuit according to claim 1, wherein each of the first static memory and the second static memory comprises a first enable terminal and a second enable terminal;

the first enable terminal of the first static memory is configured to receive the first write enable signal, and the second enable terminal of the first static memory is configured to receive the first read enable signal; and the first enable terminal of the second static memory is configured to receive the second write enable signal, and the second enable terminal of the second static memory is configured to receive the second read enable signal.

3. The video data conversion circuit according to claim 1, wherein each of the first static memory and the second static memory comprises a third enable terminal; and the data conversion circuit further comprises:

a first selector, wherein a first input terminal of the first selector is configured to receive the first write enable signal, a second input terminal of the first selector is configured to receive the first read enable signal, an output terminal of the first selector is connected to the third enable terminal of the first static memory, and the first selector is configured to selectively transmit the first write enable signal and the first read enable signal to the third enable terminal of the first static memory according to a first gating signal, so as to control the first static memory to perform data read and write operation in a time-sharing manner; and a second selector, wherein a first input terminal of the second selector is configured to receive the second write enable signal, a second input terminal of the second selector is configured to receive the second read enable signal, an output terminal of the second selector is connected to the third enable terminal of the second static memory, and the second selector is configured to selectively transmit the second write enable signal and the second read enable signal to the third enable terminal of the second static memory according to a second gating signal, so as to control the second static memory to perform data read/write operation in a time-sharing manner, wherein each group of pixel data comprises N pieces of adjacent pixel data, and the pixel splicing circuit is configured to complete pixel splicing once within every N clock cycles, N being greater than or equal to 2.

4. The video data conversion circuit according to claim 1, wherein the flag signal generating unit is configured to generate the first flag signal when a start position of the image overlap region corresponding to each row of pixel data in each frame of image data is detected, to generate the second flag signal when an end position of the image overlap region corresponding to each row of pixel data in each frame of image data is detected, and to generate the third flag signal when an end position of each row of pixel data in each frame of image data is detected.

5. The video data conversion circuit according to claim 4, wherein the flag signal generating unit is implemented by a comparator, and the comparator is configured to, by at least one of an operation for comparing a read/write address of each frame of image data to a preset reference address, and an operation for comparing a read/write time of each frame of image data to a preset time threshold, determine whether the start position and end position of the image overlap region corresponding to each row of pixel data in each frame of image data are detected, and to determine whether the end position of each row of pixel data in each frame of image data is detected.

6. The video data conversion circuit according to claim 1, further comprising:

a data alignment circuit, configured to determine storage positions of pixel data, corresponding to the start position of the image overlap region, in the first static memory and the second static memory, respectively, according to a width of a target image and the size of the image overlap region, and to perform alignment processing on the first image data and the second image data according to the determined storage positions.

7. A display device, comprising:

an interface circuit, configured to output a plurality of pieces of pixel data in each frame of image data in input video data in groups;

the video data conversion circuit, according to claim 1, configured to process each group of pixel data to convert each frame of image data into first image data representing a first part of a corresponding frame of image and second image data representing a second part of the corresponding frame of image;

a synthesis circuit, configured to perform data synthesis processing on the first image data and the second image data to obtain target image data; and a display panel, configured to complete display of the corresponding frame of image on the basis of the target image data, wherein the first part at least comprises a left half part of the corresponding frame of image, and the second part at least comprises a right half part of the corresponding frame of image, wherein the data synthesis processing includes a filtering process achieved by a multi-stage filter, wherein the first part and the second part have an overlap region, a width of the overlap region expressed in number of pixel is at least greater than one-half of the number of stages of the multi-stage filter.

8. The video data conversion circuit according to claim 1, wherein the width of the overlap region expressed in number of pixel is proportional to the number of stages of the multi-stage filter.

9. A method for video data conversion, comprising:

sequentially receiving, by a video data conversion circuit, each group of pixel data in each frame of image data in input video data, and performing pixel splicing on the received pixel data to obtain spliced pixel data; and performing data processing on the spliced pixel data to convert each frame of image data into first image data representing a first part of a corresponding frame of image and second image data representing a second part of the corresponding frame of image, wherein the first part at least comprises a left half part of the corresponding frame of image, and the second part at least comprises a right half part of the corresponding frame of image, wherein a data synthesis processing is performed on the first image data and the second image data by a subsequent-stage circuit of the video data conversion circuit, and the data synthesis processing includes a filtering process achieved by a multi-stage filter, wherein the first part and the second part have an overlap region, a width of the overlap region expressed in number of pixel is at least greater than one-half of the number of stages of the multi-stage filter, wherein a step of performing data processing on the spliced pixel data comprises:

writing the received spliced pixel data according to a first write address sequence when receiving a first write enable signal being valid, so as to store the first image data corresponding to each frame of image data, and to output the stored first image data according to a first read address sequence when receiving a first read enable signal being valid;

writing the received spliced pixel data according to a second write address sequence when receiving a second write enable signal being valid, so as to store the second image data corresponding to each frame of image data, and to output the stored second image data according to a second read address sequence when receiving a second read enable signal being valid;

outputting the first write enable signal being valid when receiving a row enable signal, and to output the first write enable signal being invalid when receiving a second flag signal;

outputting the first read enable signal being valid when receiving a first flag signal;

outputting the second write enable signal being valid when receiving the first flag signal, and to output the second write enable signal being invalid when receiving a third flag signal;

outputting the second read enable signal being valid when receiving the first flag signal; and generating the first flag signal, the second flag signal, and the third flag signal according to a row resolution of the display panel, the row enable signal, and a size of an image overlap region, wherein the image overlap region is the overlap region of the first part and the second part.

10. The method for video data conversion according to claim 9, further comprising:

performing alignment processing on the first image data and the second image data, and outputting data obtained after performing the alignment processing.

* * * * *